April 6, 1937.   O. G. PETERSEN   2,076,348
SHAKER SCREEN SUSPENSION AND OPERATION
Filed Feb. 1, 1934   2 Sheets-Sheet 1

*Oluf G. Petersen*
INVENTOR.

April 6, 1937.  O. G. PETERSEN  2,076,348
SHAKER SCREEN SUSPENSION AND OPERATION
Filed Feb. 1, 1934   2 Sheets-Sheet 2
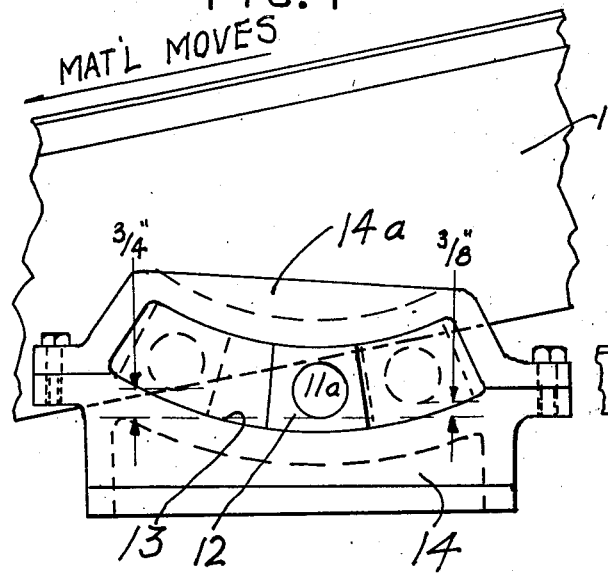
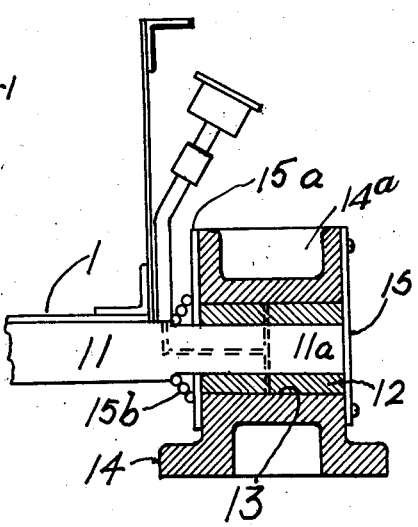
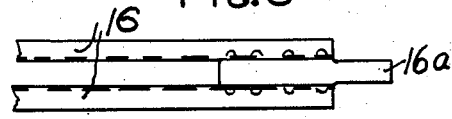
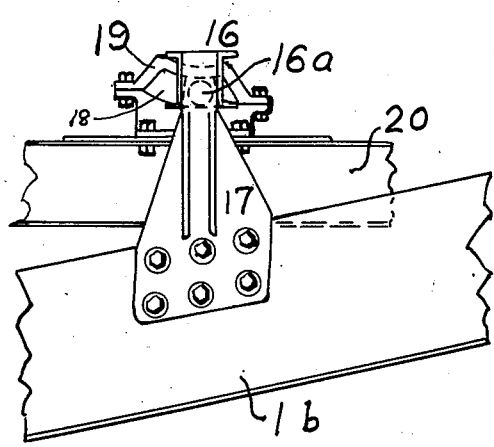
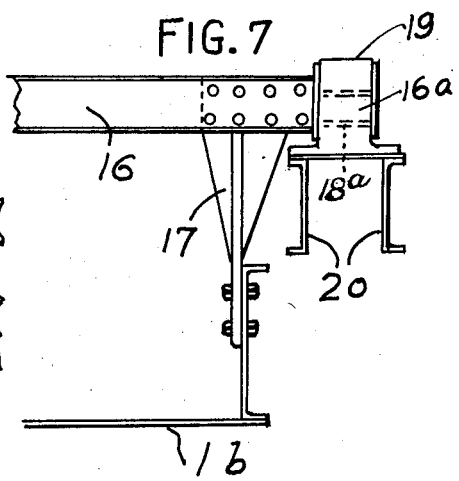
*INVENTOR.*

Patented Apr. 6, 1937

2,076,348

UNITED STATES PATENT OFFICE 2,076,348

SHAKER SCREEN SUSPENSION AND OPERATION

Oluf G. Petersen, Somerset, Ky.

Application February 1, 1934, Serial No. 709,369

11 Claims. (Cl. 209—329)

This invention relates to the suspension and operation of shaker screens; and the objects and nature of the invention will be understood by those skilled in the art in the light of the following explanations of the mechanical expressions or embodiments of the invention disclosed by the accompanying drawings and the mode or method of operating the same.

An object of the invention is to increase the screening capacity of shaker screens while minimizing lading breakage, without materially increasing power consumption.

A further object of the invention is to improve the organization and mode of operating the shaker screen disclosed by my Patent No. 1,185,433, dated May 30, 1916, with the end in view of reducing construction and upkeep costs while increasing screening capacity.

A further object of the invention is to so improve shaker screens as to increase the efficiency and desirability thereof, and render possible the decrease of or flattening out of the screen angle of inclination without thereby decreasing the screening capacity of such screen.

With the foregoing and other objects in view, apparent from the following explanations, my invention consists in certain novel features in structure, arrangements and organization, and in the mode of operation, as more fully hereinafter explained and specified.

Referring to the accompanying drawings, forming a part hereof:

Fig. 1 is a diagram illustrating an embodiment of my method of suspending and operating a shaker screen.

Fig. 2 more or less diagrammatically and in greater detail illustrates the shaker screen of Fig. 1.

Fig. 4 is a detail side elevation of a screen embodying a modified mounting or pendulum suspension.

Fig. 5 is a detail vertical section of the structure of Fig. 4.

Fig. 6 is a detail side elevation of a screen embodying another modified pendulum suspension.

Fig. 7 shows the structure of Fig. 6, in end elevation.

Fig. 8 is a detail top plan of the top cross bar.

Figure 1:
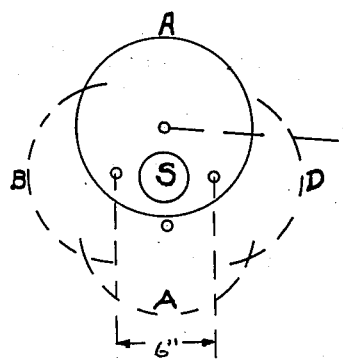
Figure 1:
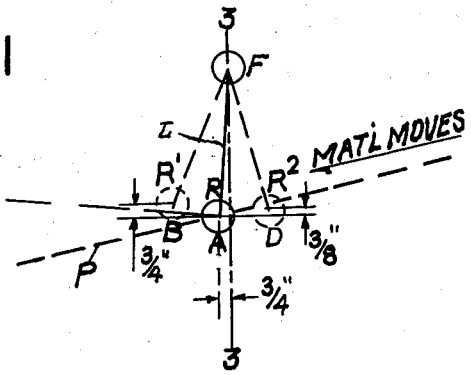

My hereinbefore identified patent discloses a screen and its support constituting a pendulum to oscillate with a true pendulum motion, with the inclined screen pan and its lading constituting the pendulum weight, and with the pendulum rod formed by several short, vertical, side links at their upper ends pivoted on supporting fulcrums formed by studs rigid with a massive supporting frame and at their lower ends carrying cross bars extending transversely across the pan at the under side thereof and upholding the same. The pendulum, thus established, was for each installation and the material to be handled, organized and proportioned to produce a pendulum swing with a rate of natural pendulum vibration, when swinging freely, approximately such as required to move the lading along the pan toward the discharge end.

The pendulum of said patent thus formed by the screen pan and its suspension was arranged to perform a normal pendulum stroke with the vertical component of the pendulum stroke the same or equal at both ends of the stroke, and hence, with the midway point in the stroke of each suspending link located in the vertical plane in which the fulcrum of the link is located. In the patent, the eccentric actuating connection was applied to the screen merely to more or less slightly boost or increase the rate of pendulum swing, say from about ninety strokes or vibrations per minute to say about one hundred and ten per minute while maintaining the forward halves of the strokes equal in length to the rearward halves of the strokes with the vertical components of the front ends of said strokes equal to the vertical components of the rear ends of the strokes.

Now, I have discovered that certain new and unexpected results are gained by so oscillating an inclined shaker screen pan and its suspension mounted to constitute a pendulum with a pendulum swing when swinging freely, as to materially increase the vertical component at the front end of the stroke with respect to the vertical component at the rear end of the stroke. Without necessarily increasing the length of the screen stroke when swinging freely as a natural pendulum, I so operate or boost the pendulum stroke as to shift the same a short distance forwardly to increase the forward upward front movement of the stroke and to the same extent decrease the rearward up movement of the stroke with respect to the center of the true pendulum stroke when the screen is swinging freely. The center of the pendulum stroke is thus under my present invention, shifted a short distance forwardly so that the forward half of the stroke, i. e. that in the direction of lading movement on the screen pan, ends in a higher horizontal plane than the horizontal plane in which the rearward half of each stroke ends, and I thereby gain a substantial increase in screening capacity, and certain other new results, as more fully explained hereinafter in connection with the embodiments of my invention disclosed as examples from among others within the spirit and scope of the invention, by the accompanying drawings.

Referring to the diagram Fig. 1, the inclined relatively heavy broken line P, represents the floor of a screen pan of the required length and, say approximately seventy inches in width and adapted to receive wet or dry material, or lading, for screening or sizing, for instance, run of the mine coal, or other coal that requires sizing or screening. The lading or material moves downwardly longitudinally of the screen toward the lower end thereof. This pan and its load constitute the weight of the pendulum. The pan is supported at the required angle of inclination by series of suspension devices that constitute the pendulum rod, one of which suspension devices is indicated in Fig. 1, as a link L, say nine inches in length from its fulcrum F, to its point of intersection with screen pan P, or its point of coupling thereto. The arrangement indicated by the diagram is such that when this pendulum is swinging freely, and is disconnected from the power driven boosting means, it will have a natural rate of vibration or pendulum vibration of, for instance, about ninety strokes per minute, each full stroke being, for instance, about six inches in length. These free pendulum strokes will thus be three inches forwardly, toward the left of Fig. 1, from the dotted center vertical center 3—3, and three inches rearwardly, toward the right Fig. 1, from said center line, with the same vertical lift or component at both the front and rear ends of the stroke. The normal center line or line of repose of the freely swingable pendulum, is the vertical plane that includes the fulcrum F, said plane being indicated by said dotted line 3—3.

In this freely swinging pendulum, gravity is depended on to actuate the pendulum and to move the lading down the screen.

However, to more or less slightly boost the rate of vibration of the screen to the extent desired, say to about the extent described by my said patent, power is applied through crank, eccentric or other suitable actuating connections, and in accordance with my present invention, the actuating power is so applied to the screen (the pendulum) as to shift the center line of the pendulum stroke forwardly the short distance necessary to gain the end I seek. With reference to said diagram, Fig. 1, I indicate any suitable actuating means to boost the rate of screen vibration, so applied to or associated with the screen, as to shift the center line of the pendulum stroke forwardly, say, about three quarters of an inch forwardly from the normal center line 3—3, to the abnormal center A, defined by line F—R, although of course, the length of this forward shift of said center line will depend on each different installation and its requirements.

The result of this shift with the screen actuated by gravity plus power through the actuating means, will be in this example, a forward stroke from the rear end limit D, defined by line F—R², to the front end limit B, defined by line F—R', with a vertical lift or component of, say, three quarters of an inch at the front end B, of the stroke, line F—R', and a vertical lift or component of, say, three-eighths of an inch, at the rear end D, of the stroke, line F—R², as indicated on the diagram.

Merely as an example of any suitable power actuating means that may be applied to boost the screen vibration rate, in said diagram, I diagrammatically illustrate an eccentric in positions A, B, A, D, driven by rotary power shaft S, and operatively connected to the screen P, by connecting rod G, having in this example, a longitudinal throw or movement of about six inches, the radial throw of the eccentric being accordingly about three inches. With the screen hanging free and at rest with its pendulum rod in the line 3—3, the connecting rod G, is operatively coupled thereto after the screen has been moved forward, in this example, about three quarters of an inch, to bring the pendulum rod to the advanced or off-center A, defined by line F—R, thus establishing the advanced center A, of the screen throw or stroke midway between the front end B, of the stroke at line F—R', and the rear end D, of the stroke at line F—R², to which lines or path of movement, D. A. B., the screen is confined by the boosting actuating means.

By thus suspending and operating the screen to produce the increased vertical component or lift on the finishing forward stroke of the screen pendulum, material increase in the screening capacity of the screen is attained, without material increase in indicated power consumption, over an otherwise like example suspended and operated in accordance with my patent as explained in lines 29 through 99, page 4, thereof.

When the screen is suspended and operated in accordance with my present invention, each elevated forward stroke of the screen, the accelerated action of power plus gravity, causes the screen to descend on its rearward stroke through the extended vertical component, more rapidly than does the lading which then drops solely under the action of gravity, thereby quickly, freeing the lading from the screen and from the screen perforations while the screen moves rearwardly with respect thereto, permitting the lading a greater freedom of movement than heretofore, and reducing to the minimum, breakage or fracturing of the lading particularly where bituminous coal is the lading or material being screened.

The lading is freed from the screen while the screen moves down and rearwardly with respect thereto through the extended front vertical component, because the screen is accelerated through this vertical component by the boosting power application above the natural period of the length of pendulum being used under the action of gravity alone. This acceleration of relative screening movement between the screen and the lading thereon toward the lower end of the screen, also permits the screens to be set at a flatter angle than heretofore, which is of particular advantage when it is desirable to locate the screen where head room is limited.

The suspension and operation of screens of my instant invention also render possible lowered construction and upkeep costs, as well as a very substantial increase in screening capacity, and a substantial decrease in bituminous coal breakage, without material increase in the small horse power referred to in the example given in said patent, to therein boost or accelerate the normal pendulum period or rate of vibration set up by said patent.

Figure 2:
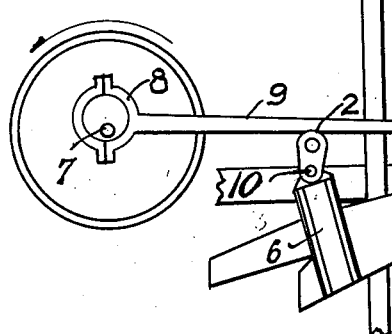
Figure 2:
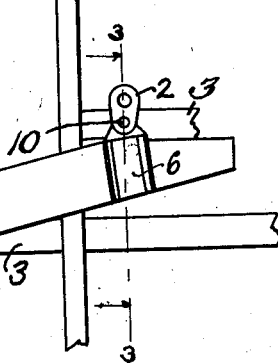
Figure 3:
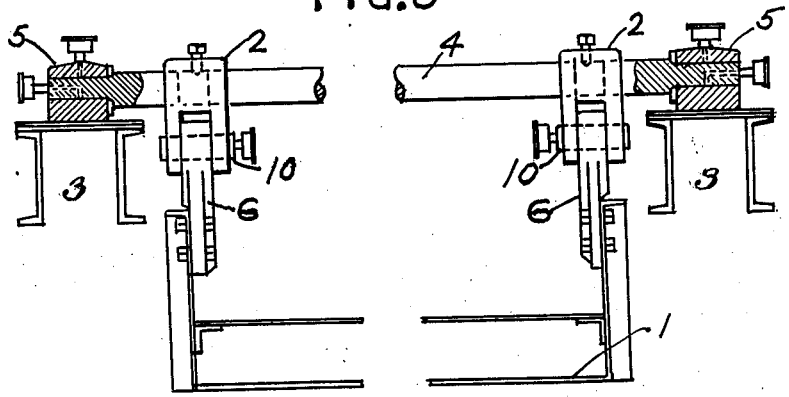
Fig. 3 is a detail cross-section on the line 3—3, Fig. 2.

In Figs. 2 and 3 of the drawings, I show an example of screening apparatus embodying my instant invention as hereinbefore described. In this example, I show an inclined vibrating screen pan 1, of any suitable construction and dimensions for the purposes of my invention, and this screen forms the weight of a short pendulum, the pendulum rod of which is formed by any suitable number of short vertical links 2, all of the same length supported from horizontal axes arranged at different elevations to support the screen at the desired angle of inclination. These pendulum links 2, are supported from beams 3, of a suitable steel supporting frame work. These short links can be for example, nine inches in effective pendulum rod length, as hereinbefore suggested, if in accord with the remaining moving parts of the particular apparatus, to attain my hereinbefore explained results.

In this example, the short pendulum links 2, are arranged in pairs, the links of a pair being fixed to and depending from a top supporting cross rock shaft 4, arranged a distance above and transversely of the screen, with the projecting ends of the shaft mounted and rockable in journal boxes or pillows 5, fixed and supported on beams 3 of the supporting frame work.

The pendulum-link forming arms 2, of a top cross shaft 4, depend to the upper ends of upstanding brackets 6, respectively, fixed to the side retaining walls of the screen and the lower end of each arm 2, is pivotally joined to the upper end of the adjacent bracket 6, by a cross pivot pin 10.

The desired number of supporting cross shafts 4, and their depending arms, are arranged longitudinally of the screen and mounted at different elevations on supporting beams of the frame work, with the arms all of the same pendulum rod lengths with respect to their pivotal couplings to the screen and all swingable in vertical planes to attain the desired short pendulum screen vibration, when free from the power actuating means, as hereinbefore described.

In this example, I show a rotary power shaft 7, mounted in the frame work, and actuating eccentric 8, having say, a six inch total throw coupled to the screen to impart thereto a pendulum stroke, say of six inches, with its stroke advanced, say, three quarters of an inch, as hereinbefore described, to provide the increased front end vertical component of, say, three quarters of an inch. In this example, the eccentric 8, is shown operatively coupled to the screen 1, by connecting rod 9, as hereinbefore described, to attain the extended forward and upward throw of the screen.

I find that this top cross bar suspension of the screen through links, such as 2, is very advantageous in elimination of undesirable shocks and vibrations on the supporting framework and operating parts, and reduces cost of construction and expense of upkeep.

In Figs. 4 and 5, I show an example of shaker screen suspension or mounting for attaining the gravity pendulum motion of my invention, as hereinbefore described, by the use of cam tracks, without the employment of swinging or pendulum links.

In this example, the inclined screen pan 1, is mounted on and carried by bottom cross shafts 11, on which the pan is secured, the desired number of shafts being at the end and intermediate portions of the pan, at different elevations.

The ends 11a, of each cross shaft project laterally beyond the pan and are cylindrical to form journals mounted to axially rock in bearings in slide blocks 12, confined to and slidable longitudinally of arcuate tracks or slideways 13, in blocks or castings 14, fixed on supporting beams of the screen supporting frame work, hereinbefore described.

For each cross shaft 11, two blocks 14, are fixed in the supporting frame, with the screen pan between and spaced from said blocks, with the shaft ends mounted in identical slides 12, in the identical cam slide ways of the blocks 14. The slideway of each block is covered by a removable cap 14a, the under side of which provides the top and, if so desired, the end walls of the slideway. This cap is preferably removably bolted onto the block and provides means, whereby the bolts can be tightened to take up wear in the slide way. The slideway of the block is preferably closed at its outer side by a plate 15, to exclude dust, while the inner side of the slideway is closed by plate 15a, pierced for shaft 11 and moving with it while pressed against the smooth surface of cam block 14 by spring 15b.

The cam tracks or slideways of the blocks are all identical in curvature and length and in length are arranged longitudinally of the screen, and these slideways are longitudinally curved or arcuate throughout their lengths, each curving upwardly toward its ends from the center of its length with the front end terminating at a greater elevation than its rear end.

In fact, these slideways simulate the movement of the screen in accordance with my invention as hereinbefore described in connection with the diagram Fig. 1. Each curved slideway describes the path followed by the circles or points $R3$, $R$, $R'$, with the extended forward and upward front end to secure the extended upward lift or vertical component at the front of each pendulum forward stroke of the screen pan.

The screen pan 1, of Figs. 4 and 5, swings on its pendulum strokes as heretofore described in connection with Fig. 1, and is confined to the required arc by the cam or curved tracks 13, to which the ends of the supporting cross bars 11, are confined.

The screen boosting power connection will be applied to the screen pan 1, of Figs. 4 and 5, to attain the rate of pendulum or screen vibration as described in connection with Figs. 1, 2 and 3, and if an eccentric is employed for this purpose, the eccentric connecting rod will be applied to the screen pan of Figs. 4 and 5, as hereinbefore described.

In Figs. 6 and 7, I show another modified screen mounting or suspension in accordance with my instant invention, and connected with the power actuating connection to attain the screen pan movement and results hereinbefore explained in connection with the disclosure of Fig. 1.

In this construction of Figs. 6, 7 and 8, the longitudinally elongated screen pan 1b, is supported in the desired downwardly inclined position, at the required angle, to attain the desired pendulum vibration or oscillation with the front end extended vertical lift or component when completing each forward stroke, by several spaced top supporting cross bars 16, arranged above the screen pan at the required different elevations, each rigidly fixed to the screen pan upstanding side walls by hangers or brackets 17, at their upper ends riveted or otherwise fixed to the end portions of the bar and at their lower ends riveted or otherwise fixed to the pan side walls, respectively. The turned or rounded end extremities, 16a, of these bars 16, project laterally beyond the vertical end of the hangers 17, and are confined to sliding movement in and longitudinally of cam or longitudinally curved slideways 18, in appropriate supporting blocks 19, rigidly secured on supporting beams 20, of the framework carrying the shaker screen apparatus.

These supporting blocks 19, and their slideways, are similar to the blocks 14, and their slideways 13, of Figs. 4 and 5, in general structure and slideway curvature and operation, to confine the screen pair to the path of movement hereinbefore described in connection with Fig. 1. The same pendulum movement of the screen pan of Figs. 4, 5, 6 and 7, is attained, as in the diagram Fig. 1.

In this organization of Figs. 6 through 8, I show each top cross bar 16 composed of a pair of metal channel bars and the supporting ends 16a, composed of solid metal bars or castings arranged between the channels and bolted or otherwise fixed thereto to provide a most strong, rigid structure of comparatively low cost.

What I claim is:—

1. The method of screening material, by feeding the same as lading forwardly along a vibratory screen, where such screen and the lading thereon and its vibratory support, when permitted to swing freely, constitute a short arm pendulum having a natural rate of gravity vibration slightly less than that necessary to feed the lading forward on the screen; which includes forcibly boosting the gravity-pendulum rate of vibration of said screen to the extent necessary to smoothly advance said lading along said screen, while maintaining said pendulum that includes the screen slightly advanced to thereby advance the full pendulum path in which said screen vibrates and correspondingly slightly increase the vertical component of the forward screen movement, and decrease the vertical component of an upwardly curving rearward movement of said screen, thereby increasing the screening capacity and reducing lading bouncing and breakage, while utilizing gravity in association with said boosting force to avoid substantial power increase.

2. The method of screening material, by feeding the same as lading forwardly along a vibratory screen, where such screen and the lading thereon and its vibratory support, when permitted to swing freely, constitute a short arm pendulum having a natural rate of gravity vibration slightly less than that necessary to feed the lading forward on the screen; which includes forcibly boosting the gravity-pendulum rate of vibration of said screen under the cooperation of gravity, to the extent necessary to smoothly advance said lading along said screen, while maintaining said pendulum that includes the screen, slightly advanced to thereby advance the full concaved path in which said screen vibrates thereby increasing the forward vertical movement of the screen while maintaining the upwardly curving rearward movement of the screen with a shortened vertical component, to increase the screening capacity without substantial increase of boosting power and friable lading bouncing and breakage.

3. A screening apparatus, comprising a screen and its vibratory support; said screen and its support and lading, when released for free gravity vibration, constituting a short arm pendulum having a natural pendulum rate of gravity vibration; and actuating mechanism associated with said pendulum that includes said screen to forcibly boost its said natural rate of vibration with the cooperation of gravity, to smoothly advance the lading on the screen; said mechanism providing means to constantly maintain said pendulum that includes said screen, but slightly advanced, thereby correspondingly advancing the full stroke path curving upwardly at both ends, in which said screen moves to slightly increase the vertical component of the screen upward forward stroke, whereby the screening capacity is increased without substantial power increase and without increase in lading breakage.

4. Screening apparatus, comprising a screen and its vibratory support, said screen, its load and said support when released for free gravity swing, constituting a short arm pendulum having a natural rate of gravity vibration almost sufficient to move the lading on the screen; and driving mechanism operatively associated with said screen to boost the said rate of gravity vibration of the screen to the extent necessary to smoothly advance the lading on the screen; means being provided constantly acting to maintain said pendulum slightly advanced throughout its full pendulum strokes to correspondingly advance the full length path of movement of said screen and thereby slightly increase the forward vertical movement of the screen and decrease the rear upwardly curving vertical movement of the screen, whereby gravity cooperates with said mechanism at both the rear and front vertical movements, and the screening capacity is increased without substantial increase in boosting power or in lading breakage.

5. A screening apparatus, comprising a screen and its vibratory support, said screen and its load and said support, when free to swing under the action of gravity, constituting a short arm pendulum having a natural rate of gravity swing less than that necessary to advance the lading on the screen; and actuating mechanism operatively associated with said screen to cooperate with gravity in boosting the rate of vibration of said screen to the extent necessary to smoothly advance the lading on the screen; means being provided constantly maintaining said pendulum that includes said screen slightly advanced throughout its full pendulum strokes to correspondingly advance its full path of movement, and thereby slightly increase the forward vertical movement of the screen and decrease the rearward vertical movement of the screen, whereby the screen capacity is increased without increase in lading breakage and without substantial increase in boosting power.

6. Screening apparatus comprising a screen and its vibratory support, said screen and its load and said support, when free to swing under the action of gravity constituting a short arm pendulum with a natural pendulum vibration rate, say of approximately ninety strokes per minute; driving mechanism operatively associated with said screen to cooperate with gravity in boosting the rate of vibration of said screen to say approximately one hundred and ten strokes per minute where the pendulum rod is say approximately nine inches in length and the horizontal path of screen movement is say approximately six inches in length, to thereby smoothly advance the lading on the screen; means being provided constantly maintaining said screen slightly advanced say approximately three quarters of an inch to correspondingly advance its said full horizontal path of movement, thereby correspondingly increasing the vertical component of the screen forward upward swing, and slightly decreasing the vertical component of the screen rearward upward swing, whereby the screen capacity is increased without increase in lading breakage or substantial increase in power requirement.

7. Screening apparatus comprising a vibratory screen, and a support therefor, rendering said screen when released for free vibration, capable of gravity movement in a short-radius arcuate path corresponding to that of a short arm pendulum screen having a natural pendulum rate of gravity vibration not sufficient for advancing lading on the screen; and screen actuating mechanism for boosting said rate of vibration of said screen with the cooperation of gravity, to smoothly advance the lading on the screen; means being provided constantly maintaining said screen bodily advanced throughout its said short-radius arcuate path of movements and correspondingly advancing said path, to thereby slightly increase the vertical component of its forward strokes and decrease the vertical component of its rearward strokes, whereby the screening capacity is increased without substantial power and lading breakage increase.

8. Screening apparatus comprising a vibratory screen pan having pairs of side supporting brackets fixed thereto and upstanding from the opposite sides thereof, said pairs being spaced longitudinally of said pan; a supporting frame provided with spaced cross rock shafts arranged above said pairs of brackets respectively, short-radius crank arms fixed to and depending from each rock shaft and at their lower ends pivoted to the upper portions of each complementary pair of said brackets, rendering said screen pan, where released for free vibration, capable of gravity movement in a short radius arcuate path corresponding to that of a short arm pendulum screen having a natural pendulum rate of gravity vibration not sufficient for advancing lading on the screen pan; and screen pan actuating mechanism for boosting said rate of vibration of said screen pan with the cooperation of gravity, to smoothly advance the lading in the screen pan; means being provided constantly maintaining said screen pan bodily advanced throughout its said short radius arcuate path of movements and correspondingly advancing said path, to thereby slightly increase the vertical component of its forward strokes and decrease the vertical component of its rearward strokes, whereby the screening capacity is increased without substantial increase in lading breakage and power consumption.

9. Screening apparatus comprising a vibratory screen pan mounted to render the same, when released for free gravity vibration, capable of gravity movement in a short radius arcuate path substantially corresponding to that of a short arm pendulum screen having a natural pendulum rate of gravity vibration insufficient to advance the lading on the screen; actuating mechanism for said screen pan for boosting its said gravity rate of vibration, to advance the lading on said pan, and constantly maintaining said screen pan advanced to correspondingly advance its said short-radius arcuate path of movement, to thereby slightly increase the vertical component of its forward strokes; and a supporting mounting for said screen pan embodying a supporting frame, screen pan supporting members movable therewith and arranged laterally with respect to the longitudinal axis thereof, and screen-pan-supporting closed cam slide or track ways fixed to said frame, one for each of said members, said slideways being arranged longitudinally of said screen pan, each slideway describing said advanced short-radius arcuate path of movement of said screen pan with its upwardly and forwardly extended end, each of said members being supported by and freely movable longitudinally of and held down by its complementary closed slideway to said defined path whereby said screen pan is confined on its longitudinal vibrations to and against movement from said advanced short-radius arcuate path of movement defined by said slideways with said screen pan supporting members as a unit freely movable longitudinally of said fixed supporting confining slideways.

10. The organization and movements required by claim 9, where said screen pan supporting members are formed by pairs of opposite lateral journals spaced longitudinally of and fixed to said pan, and said supporting cam slideways on the supporting frame provide longitudinal slots of said short-radius arcuate form, closed at the top, bottom and ends, with supports confined and freely movable longitudinally in said slots, said journals being mounted in said supports, respectively.

11. The organization and movements required by claim 9, where said screen pan is provided with and supported by rigid elevated top cross bars having supporting lateral end journals, and said supporting frame is provided with elevated fixed longitudinal screen-supporting closed slideways of said short-radius arcuate form, one for each journal, with supports on and freely movable longitudinally of said tracks, in which said journals are mounted.

OLUF G. PETERSEN.